(12) United States Patent
Heard

(10) Patent No.: US 9,315,153 B2
(45) Date of Patent: Apr. 19, 2016

(54) VEHICLE DOOR WITH SIDE MIRROR SYSTEM

(71) Applicant: GM GLOBAL TECHNOLOGY OPERATIONS LLC, Detroit, MI (US)

(72) Inventor: Charles H. Heard, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 162 days.

(21) Appl. No.: 13/961,941

(22) Filed: Aug. 8, 2013

(65) Prior Publication Data

US 2015/0046042 A1 Feb. 12, 2015

(51) Int. Cl.
*B60R 1/00* (2006.01)
*G05D 3/00* (2006.01)
*B60R 1/074* (2006.01)

(52) U.S. Cl.
CPC ............... *B60R 1/006* (2013.01); *B60R 1/074* (2013.01); *G05D 3/00* (2013.01)

(58) Field of Classification Search
CPC ........................................................ B60R 1/006
USPC ............................................ 701/49; 296/1.11
See application file for complete search history.

(56) References Cited

U.S. PATENT DOCUMENTS

| 5,150,941 | A | * | 9/1992 | Silzer et al. | 296/152 |
|---|---|---|---|---|---|
| 5,460,425 | A | * | 10/1995 | Stephens | 296/152 |
| 7,648,185 | B2 | * | 1/2010 | Beigel et al. | 296/1.11 |
| 2001/0024371 | A1 | * | 9/2001 | Pastrick et al. | 362/494 |
| 2002/0048095 | A1 | * | 4/2002 | Boddy | B60R 1/078 359/841 |
| 2004/0114384 | A1 | * | 6/2004 | Carter et al. | 362/494 |
| 2014/0015975 | A1 | * | 1/2014 | Pastrick et al. | 348/148 |

* cited by examiner

*Primary Examiner* — Muhammad Shafi
*Assistant Examiner* — Majdi Alsomiri
(74) *Attorney, Agent, or Firm* — Quinn Law Group, PLLC

(57) ABSTRACT

A vehicle door assembly includes a door having a window and a mirror assembly. The mirror assembly includes a housing defining a cavity having an opening. A mirror is mounted with respect to the housing, disposed within the cavity, and has a reflective surface that is visible through the opening. The housing is mounted with respect to the door such that the housing is selectively movable between an extended position, in which the opening of the cavity is unobstructed, and a retracted position, in which the opening of the cavity is obstructed by the window.

15 Claims, 3 Drawing Sheets

VEHICLE DOOR WITH SIDE MIRROR SYSTEM

TECHNICAL FIELD

This invention relates to side mirrors for vehicles.

BACKGROUND

Vehicle door assemblies typically include a mirror to enable a driver to view the region rearward of the mirror assembly. The mirror is disposed outside the vehicle passenger compartment, and is thus exposed to the surrounding atmosphere.

SUMMARY

A vehicle door assembly includes a door having a window and a mirror assembly. The mirror assembly includes a housing defining a cavity having an opening. A mirror is mounted with respect to the housing, disposed within the cavity, and has a reflective surface that is visible through the opening. The housing is mounted with respect to the door such that the housing is selectively movable between an extended position, in which the opening of the cavity is unobstructed, and a retracted position, in which the opening of the cavity is obstructed by the window.

Accordingly, with the opening obstructed, snow, ice, and condensation will not accumulate on the reflective surface of the mirror. The housing may be moved to the retracted position when the vehicle is not in use to keep the reflective surface clear, and then moved to the extended position when the vehicle is in use.

A corresponding method is also provided.

The above features and advantages and other features and advantages of the present invention are readily apparent from the following detailed description of the best modes for carrying out the invention when taken in connection with the accompanying drawings.

DETAILED DESCRIPTION

Figure 1:
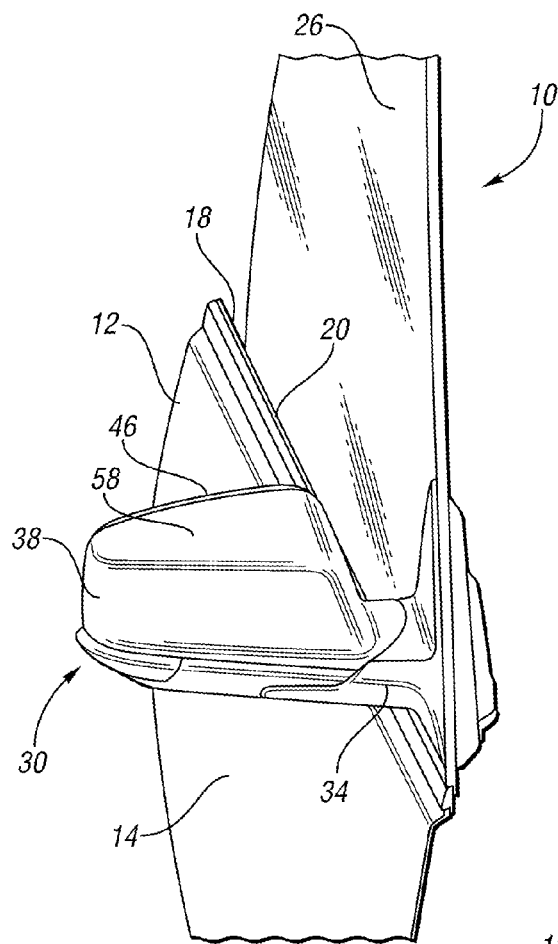
FIG. 1 is a schematic, perspective, front view of a vehicle door assembly, including a window and a mirror assembly having a housing in a first, extended position.

Referring to FIG. 1, a vehicle side door assembly 10 is schematically depicted. The door assembly 10 includes a door 12 having an outer panel 14 extending upward to a beltline molding 18. The beltline molding 18 is attached to the outer panel 14 and defines the lower extent of a window opening 20. The outer panel 14 cooperates with an inner panel (not shown) to define a door cavity (shown at 22 in FIG. 4). The door 12 also includes a window 26 that is partially disposed inside the door cavity, where the window 26 is movably mounted with respect to the inner and outer panels via a window regulator (not shown). In its closed position, the window 26 extends from the door cavity 2 (below the beltline 18) upward into the window opening 20 to obstruct the window opening 20.

The door assembly 10 also includes a side rearview mirror assembly 30, which is mounted with respect to the outer panel 14 near the forward, lower corner of the window opening 20. The mirror assembly 30 includes at least one support member 34 that is mounted with respect to the outer panel 14 and supports a housing 38. In the embodiment depicted, the mirror assembly 30 includes a single support member 34 that is mounted with respect to the outer panel 14 and that supports the housing 38 in a cantilever fashion.

Figure 2:
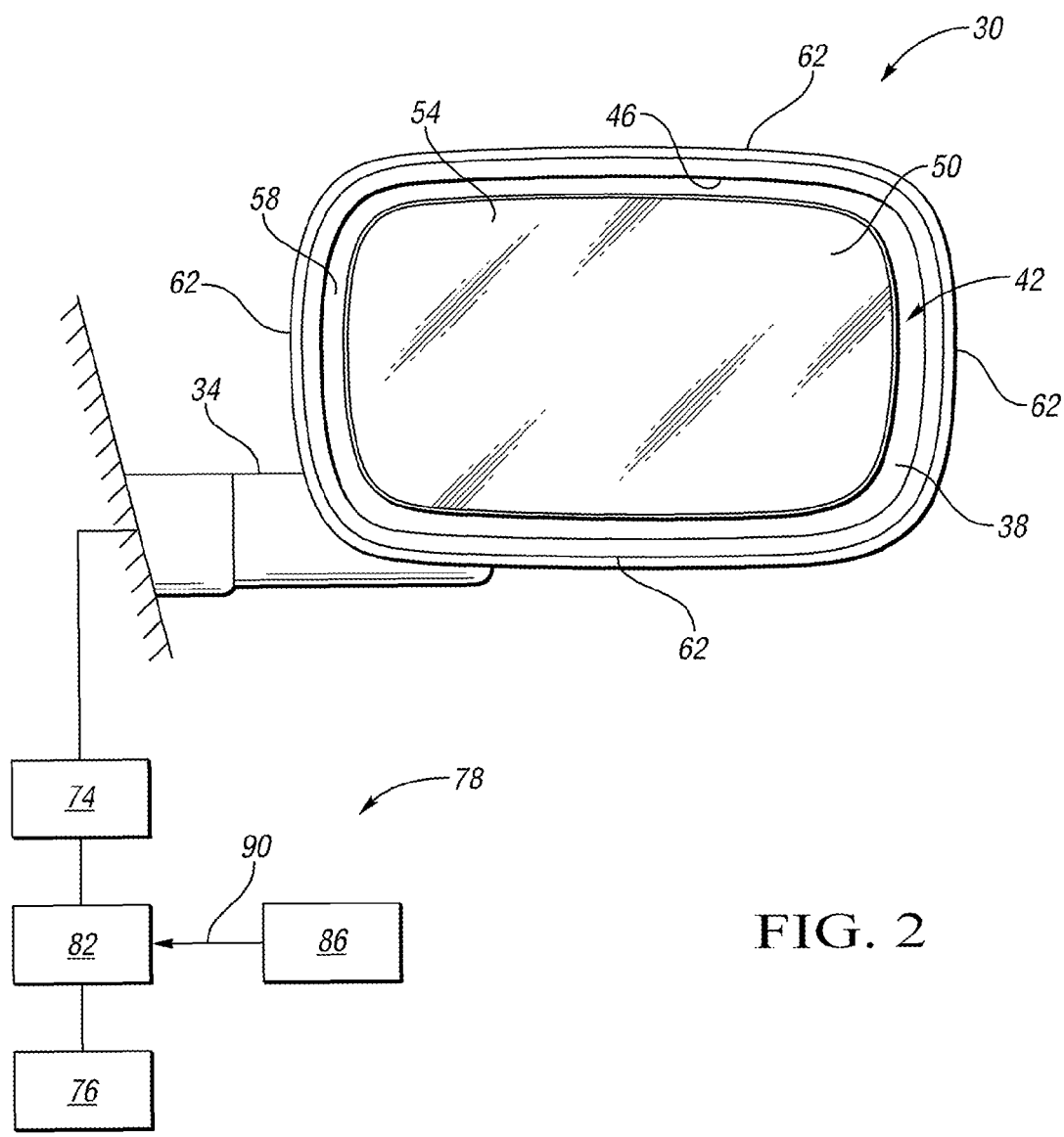
FIG. 2 is a schematic, rear view of the mirror assembly of FIG. 1.
Figure 4:
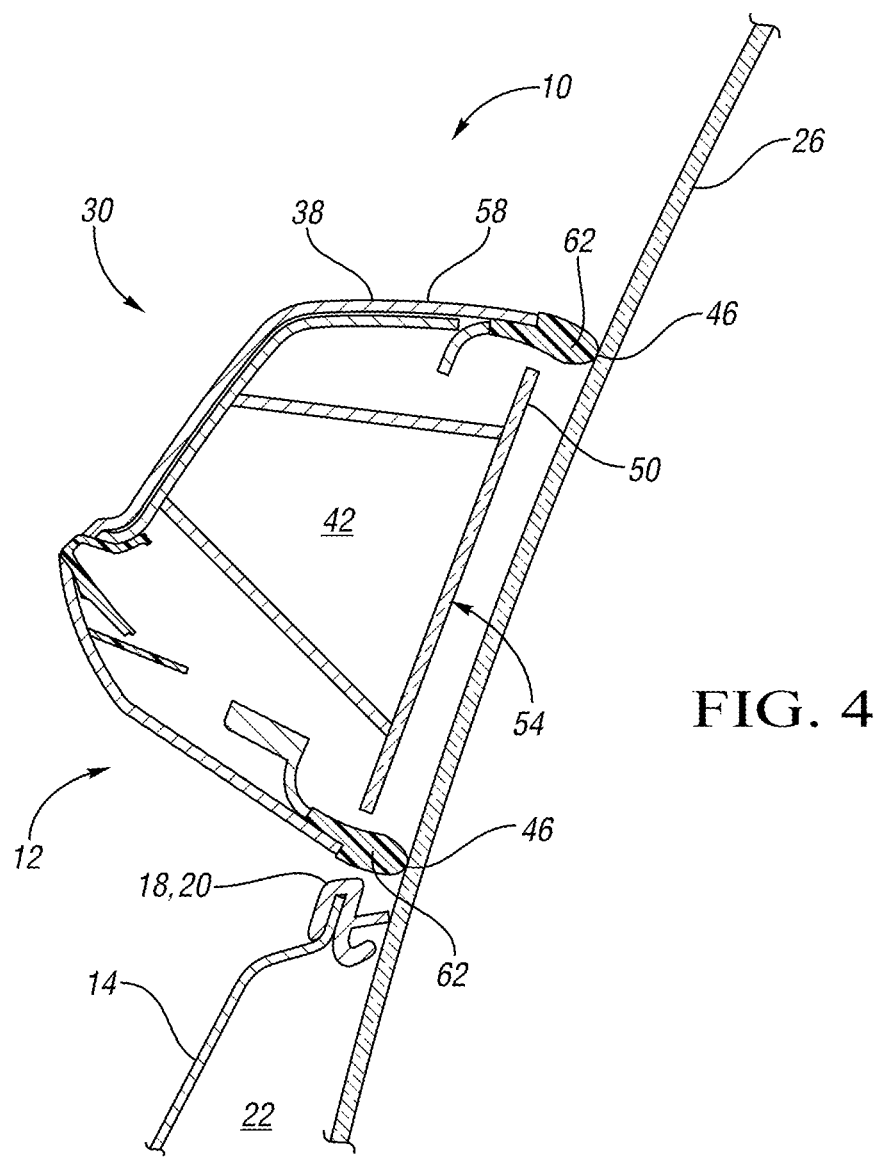
FIG. 4 is a schematic, cross-sectional view of a portion of the door assembly of FIG. 1 with the housing in the second, retracted position.

Referring to FIGS. 2 and 4, the housing 38 defines a cavity 42 having an opening 46. A mirror 50 has a reflective surface 54, and is mounted with respect to the housing 38 such that the mirror 50 is disposed within the cavity 42 and the reflective surface 54 is visible through the opening 46. In the embodiment depicted, the housing 38 includes a generally rigid member 58 that defines most of the cavity 42, and an elastomeric seal member 62 that cooperates with the rigid member 58 to further define a portion of the cavity 42. The seal member 62 also defines the opening 46 of the cavity 42.

The attachment of the mirror 50 to the rigid member 58 is shown highly schematically in FIG. 4; it should be noted that any attachment technique may be employed within the scope of the claimed invention to attach the mirror 50 to the housing 38; for example, the mirror 50 may be selectively movable with respect to the housing 38 so that a driver of the vehicle to which the mirror assembly 30 is attached can adjust the mirror's position relative to the housing 38.

Figure 3:
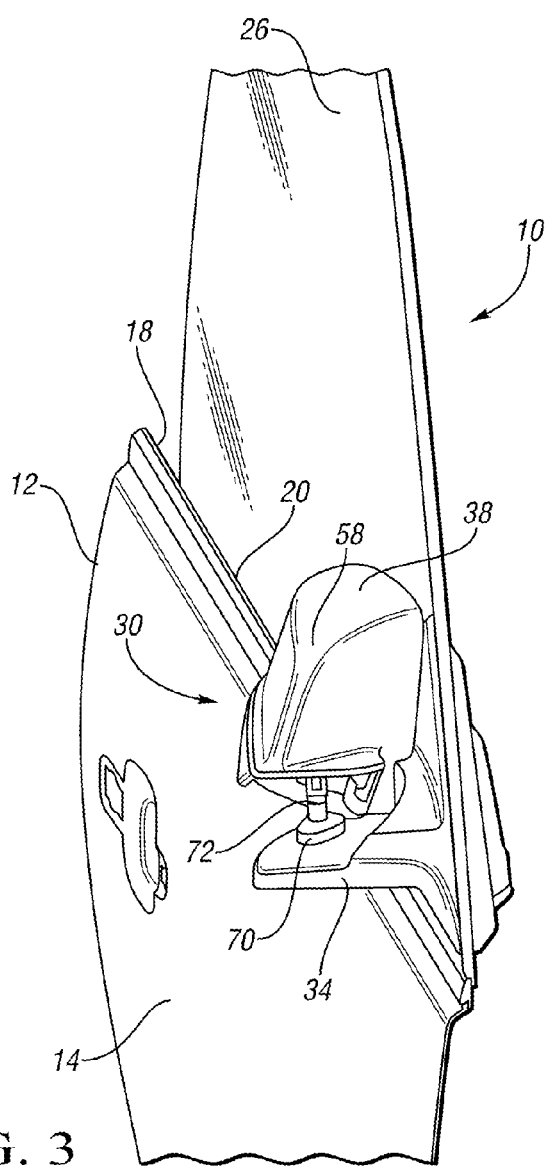
FIG. 3 is a schematic, perspective, front view of the vehicle door assembly of FIG. 1, with the housing in a second, retracted position.

The housing 38 is selectively movable with respect to the window 26 between a first position, as shown in FIGS. 1 and 2, and a second position, as shown in FIGS. 3 and 4. The mirror 50 is mounted with respect to the housing 38 such that the housing 38 and the mirror 50 move together as a single unit when the housing 38 is moved between the first and second positions. Referring again to FIGS. 1 and 2, when the housing 38 is in the first position, the opening 46 to the cavity 42 faces generally rearward so that a driver of the vehicle can view the reflective surface 54 of the mirror 50, and thereby view the area rearward of the vehicle reflected in surface 54.

The opening 46 is unobstructed and the surface 54 is exposed to the atmosphere when the housing 38 is in the first position; accordingly, under certain weather conditions, snow or ice may build up on the reflective surface 54 due to its exposure to the surrounding air. To prevent the accumulation of ice or snow on the reflective surface 54, the housing 38 is movable to the second position, as shown in FIGS. 3 and 4. Referring to FIGS. 3 and 4, when the housing 38 is in the second position, the housing 38 contacts the outer surface of the window 38 such that the window 26 obstructs the opening 46.

More particularly, in the embodiment depicted, the elastomeric seal member 62 contacts the outer surface of the window 26 when the housing 38 is in the second position; the contact between the seal member 62 and the window 26 creates an air-tight seal 66 between the cavity 42 and the surrounding atmosphere. More specifically, in the embodiment depicted, the seal member 62 is compressed against the window 26, and the seal member 62 continuously contacts the window 26 around the opening 46, thereby preventing the transfer of gas or liquid between the cavity 42 and the atmosphere. Thus, when the housing 38 is in the second position, ice, snow, frost, or moisture condensation is unlikely to form on the reflective surface 54 inside the cavity 42.

The mirror assembly 30 also includes a device or mechanism to maintain the housing 38 in the first and second positions. In the embodiment depicted, the mirror assembly 30 includes a detent mechanism 70 that resists movement of the housing 38 from the first position and from the second position. In the embodiment depicted, the housing 38 rotates about a pivot 72 between the first and second positions; however, any mechanism or device for guiding the housing 38 between the first and second positions may be employed within the scope of the claims. The pivot 72 in the embodiment depicted is supported by the support member 34 and permits the housing 38 to rotate relative to the support member 34 and the door 12 between the first and second positions.

The housing 38 may be moved manually. For example, a vehicle user may manually move the housing from the first position to the second position when the vehicle is parked to prevent the accumulation of moisture from the atmosphere on the reflective surface 54, and then manually moving the housing 38 from the second position to the first position prior to operating the vehicle. Alternatively, and with reference to FIG. 2, the mirror assembly 30 may include an actuator, such as an electric motor 74, that is operatively connected to the housing 38 and configured to selectively move the housing 38 between the first and second positions. A source of electrical energy, such as a battery 76, is operatively connected to the motor 74.

In the embodiment depicted, the vehicle includes a control system 78 operatively connected to the motor 74, and configured to control the motor 74 and thereby control the position of the housing 38. More specifically, the control system 78 is configured to cause the motor 74 to move the housing 38 from the extended position to the retracted position when a plurality of predetermined conditions exists.

The control system 78 includes an electronic controller 82 that controls the flow and polarity of current from the battery 76 to the motor 74, which in turn controls whether the motor 74 is moving the housing 38 and the direction in which the motor 74 is moving the housing 38. Thus, the controller 82 is operatively connected to the motor 74 such that the controller 82 controls the position of the housing 38. The control system 78 includes sensors 86 that are configured to detect the existence of the predetermined conditions and that are operatively connected to the controller 82 to transmit signals 90 indicating the existence of the predetermined conditions to the controller 82. The controller 82 is configured to cause the motor 74 to move the housing 38 to the retracted position when the sensor signals 90 indicate the existence of the predetermined conditions.

In one embodiment, the predetermined conditions include at least one condition indicative of the accumulation of moisture (e.g., condensation, ice, snow) on the mirror, and at least one condition indicative of the vehicle being stationary and not in use. For example, the predetermined conditions indicative of the accumulation of moisture may include atmospheric conditions, such as atmospheric temperature around the vehicle and the relative humidity of the air surrounding the vehicle. Conditions indicative of the vehicle being stationary and not in use include the vehicle ignition switch being in the off position, the occupant sensors inside the vehicle indicating that nobody is present inside the vehicle, etc.

The control system 78, battery 76, etc. may be disposed, for example, inside the door cavity (shown at 22 in FIG. 4), inside the engine compartment (not shown) of the vehicle, etc.

While the best modes for carrying out the invention have been described in detail, those familiar with the art to which this invention relates will recognize various alternative designs and embodiments for practicing the invention within the scope of the appended claims.

The invention claimed is:

1. A vehicle door assembly comprising:
a door having a window;
a mirror assembly including a housing defining a cavity having an opening, a mirror mounted with respect to the housing, disposed within the cavity, and having a reflective surface that is visible through the opening;
wherein the housing is mounted with respect to the door such that the housing is selectively movable between an extended position, in which the opening of the cavity is unobstructed, and a retracted position, in which the opening of the cavity is obstructed by the window; and
wherein the housing includes an elastomeric seal member that contacts the window when the housing is in the retracted position.

2. The vehicle door assembly of claim 1, wherein the window and the housing form an air-tight seal between the cavity and the surrounding atmosphere when the housing is in the retracted position.

3. The vehicle door assembly of claim 1, further comprising a detent mechanism operatively connected to the housing and configured to resist movement of the housing from the extended and retracted positions.

4. The vehicle door assembly of claim 1, further comprising an actuator operatively connected to the housing and configured to selectively move the housing between the extended and retracted positions.

5. The vehicle door assembly of claim 4, further comprising a control system operatively connected to the actuator and configured to cause the actuator to move the housing from the extended position to the retracted position when a plurality of predetermined conditions exists.

6. The vehicle door assembly of claim 5, wherein the control system includes a controller operatively connected to the actuator such that the controller controls the position of the housing; and
at least one sensor configured to detect the existence of the predetermined conditions and operatively connected to the controller to transmit signals indicating the existence of the predetermined conditions to the controller;
wherein the controller is configured to cause the actuator to move the housing to the retracted position when the sensor signals indicate the existence of the predetermined conditions.

7. The vehicle door assembly of claim 6, wherein the plurality of predetermined conditions includes the humidity being above a predetermined amount.

8. The vehicle door assembly of claim 6, wherein the plurality of predetermined conditions includes an ignition switch being off.

9. The vehicle door assembly of claim 5, wherein the plurality of predetermined conditions includes the temperature being below a predetermined amount.

10. A method for reducing or preventing the accumulation of water on a mirror attached to a vehicle door that includes a window, with a mirror assembly including a housing defining a cavity having an opening, wherein the mirror assembly includes the mirror mounted with respect to the housing and disposed within the cavity, with the mirror having a reflective surface that is visible through the opening, the method comprising:
moving the housing, which is mounted with respect to the vehicle door, from an extended position, in which the opening of the cavity is unobstructed, to a retracted position, in which the opening to the cavity is obstructed by the window; and wherein the housing includes an elastomeric seal member that contacts the window when the housing is in the retracted position.

11. The method of claim 10, wherein the window and the housing form an air-tight seal between the cavity and the surrounding atmosphere when the housing is in the retracted position.

12. The method of claim 11, further comprising detecting the presence of a plurality of predetermined conditions; and
moving the housing from the extended position to the retracted position in response to detecting the presence of the plurality of predetermined conditions.

13. The method of claim 12, wherein the plurality of predetermined conditions includes the temperature being below a predetermined amount.

14. The method of claim 12, wherein the plurality of predetermined conditions includes the humidity being above a predetermined amount.

15. The method of claim 12, wherein the plurality of predetermined conditions includes an ignition switch being off.

* * * * *